(12) United States Patent
Thoma et al.

(10) Patent No.: US 7,878,574 B2
(45) Date of Patent: Feb. 1, 2011

(54) VEHICLE SKYLIGHT AND METHOD FOR INSTALLING SAME

(75) Inventors: Michael L. Thoma, Lafayette, IN (US); Danny L. Gilbert, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 88 days.

(21) Appl. No.: 12/357,204

(22) Filed: Jan. 21, 2009

(65) Prior Publication Data
US 2009/0189416 A1   Jul. 30, 2009

Related U.S. Application Data

(60) Provisional application No. 61/023,962, filed on Jan. 28, 2008.

(51) Int. Cl.
*B60J 1/10* (2006.01)
(52) U.S. Cl. .................. 296/146.15; 296/201
(58) Field of Classification Search ............ 296/146.15, 296/201; 52/19, 22, 72, 200, 309.9, 788, 52/790
See application file for complete search history.

(56) References Cited

U.S. PATENT DOCUMENTS

| | | | |
|---|---|---|---|
| 4,193,237 A | 3/1980 | Jankowski | |
| 4,549,379 A | 10/1985 | Hoy et al. | |
| 5,545,854 A | 8/1996 | Ishida | |
| 6,378,931 B1 * | 4/2002 | Kolluri et al. | 296/146.15 |
| 6,422,156 B1 | 7/2002 | Winsor et al. | |

OTHER PUBLICATIONS

PCT International Search Report and Written Opinion for PCT/US2009/31505 dated Mar. 9, 2009 (8 pages).

* cited by examiner

*Primary Examiner*—Lori L Lyjak
(74) *Attorney, Agent, or Firm*—Barnes & Thornburg LLP

(57) ABSTRACT

A skylight is provided for mounting to a wall of a vehicle to allow passage of light through the wall. The skylight may include a frame having a window that is configured to allow passage of light through at least a portion of the frame, and the frame may define an inner periphery about the window. A wall member may extend away from the frame adjacent to and about the inner periphery of the frame. A plurality of spaced apart gripping arms may extend away from one of the wall member and the frame adjacent to the inner periphery of the frame with the plurality of gripping arms extending beyond the wall member. Each of the plurality of gripping arms may be configured to engage the wall of the vehicle.

33 Claims, 4 Drawing Sheets

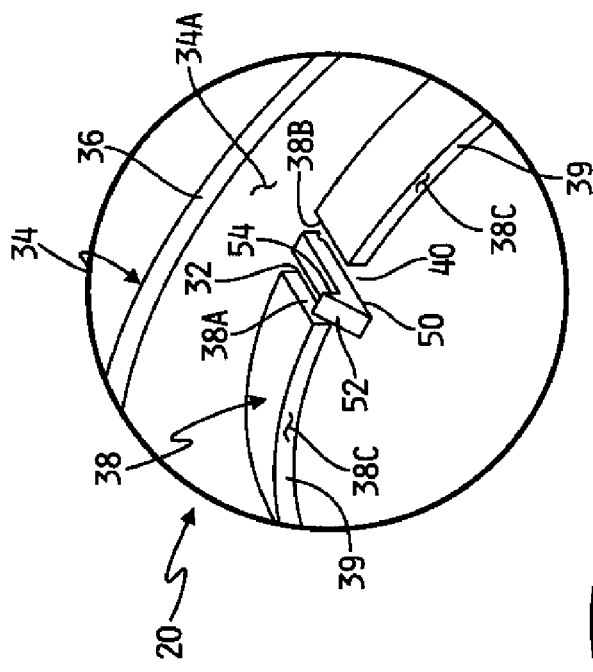
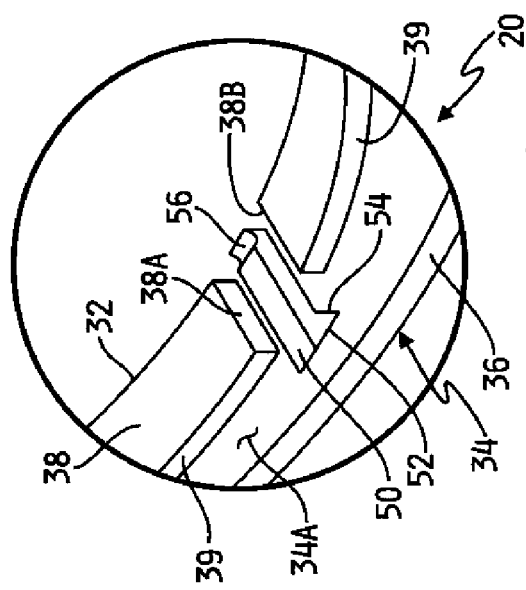
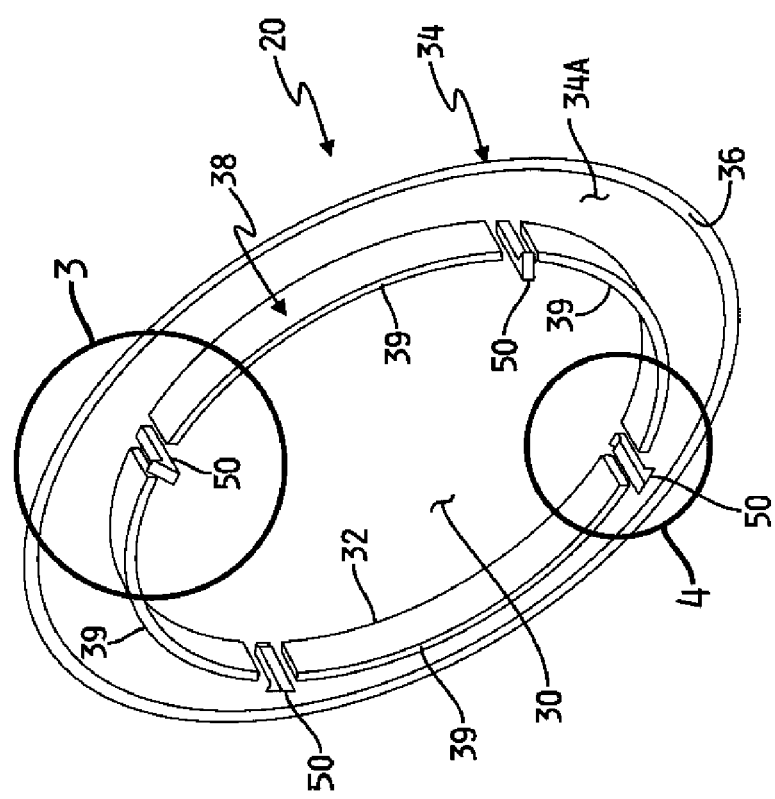

```
                                    ┌─ 70
                                    ↙

┌─────────────────────────────────────────────┐
│   PROVIDE SKYLIGHT HAVING A FRAME DEFINING AN │
│   INNER PERIPHERY ABOUT A WINDOW AND HAVING A │──72
│   FLANGE EXTENDING AWAY FROM THE INNER PERIPHERY │
│     OF THE FRAME AND A PLURALITY OF GRIPPING  │
│      ARMS EXTENDING AWAY FROM THE INNER PERIPHERY │
│                OF THE FRAME                   │
└─────────────────────────────────────────────┘
                     │
                     ▼
┌─────────────────────────────────────────────┐
│   FORM AN OPENING THROUGH A WALL OF A         │
│   VEHICLE THAT IS SIZED LARGER THAN THE       │──74
│       INNER PERIPHERY OF THE FRAME            │
└─────────────────────────────────────────────┘
                     │
                     ▼
┌─────────────────────────────────────────────┐
│   APPLY A BONDING MEDIUM TO THE INNER         │
│   SURFACE OF THE FLANGE ABOUT THE INNER       │──76
│           PERIPHERY OF THE FRAME              │
└─────────────────────────────────────────────┘
                     │
                     ▼
┌─────────────────────────────────────────────┐
│   INSERT GRIPPING ARMS INTO OPENING THROUGH   │
│   VEHICLE WALL SUCH THAT THE BONDING MEDIUM   │──78
│   CONTACTS THE FLANGE AND THE OUTER SURFACE   │
│    OF THE VEHICLE WALL ABOUT THE OPENING      │
│    AND THE GRIPPING ARMS ENGAGE AN INNER      │
│    SURFACE OF THE WALL ADJACENT THE OPENING   │
└─────────────────────────────────────────────┘
                     │
                     ▼
┌ ─ ─ ─ ─ ─ ─ ─ ─ ─ ─ ─ ─ ─ ─ ─ ─ ─ ─ ─ ─ ─ ─ ┐
│   BREAK GRIPPING ARMS AWAY FROM INNER         │──80
│   PERIPHERY OF THE FRAME AFTER BONDING        │
│              MEDIUM CURES                     │
└ ─ ─ ─ ─ ─ ─ ─ ─ ─ ─ ─ ─ ─ ─ ─ ─ ─ ─ ─ ─ ─ ─ ┘
```

FIG. 7

VEHICLE SKYLIGHT AND METHOD FOR INSTALLING SAME

CROSS-REFERENCE

This application claims priority under 35 U.S.C. 119(e) to U.S. Provisional Application Ser. No. 61/023,962, filed Jan. 28, 2008, the disclosure of which is expressly incorporated herein by reference.

FIELD OF THE INVENTION

The present invention relates generally to mobile vehicles including towing vehicles and towed vehicles, and more specifically to skylights configured for installation on such vehicles to provide lighting to the vehicle interior.

BACKGROUND

Skylights for mobile vehicles are known, as are various techniques for attaching skylights to mobile vehicles. It is desirable to provide for a skylight that can be easily installed and bonded directly to a wall of the mobile vehicle.

SUMMARY

The present invention may comprise one or more of the features recited in the attached claims, and/or one or more of the following features and combinations thereof. A skylight is provided for mounting to a wall of a vehicle to allow passage of light through the wall. The skylight may comprise a frame having a window configured to allow passage of light through at least a portion of the frame. The frame may define an inner periphery about the window. A wall member may extend away from the frame adjacent to and about the inner periphery of the frame. A plurality of spaced apart gripping arms may extend away from the wall member or from the frame adjacent to the inner periphery of the frame with the plurality of gripping arms extending beyond the wall member. Each of the plurality of gripping arms may be configured to engage an inner surface of the wall of the vehicle.

The window may be separate from, and configured to be mounted to, the frame. Alternatively, the window and the frame may be of unitary construction.

The wall member may comprise a number of separate wall sections each extending from the frame adjacent to and about the inner periphery of the frame. Adjacent ones of each the number of wall sections may define a gap therebetween. Each of the plurality of gripping arms may extend from the frame within a different one of the gaps defined between adjacent ones of the number of separate wall sections. The gaps may or may not be substantially equally spaced about and adjacent to the inner periphery of the frame. Each of the plurality of gripping arms may define a notch therein adjacent to the frame and configured to facilitate breaking of the gripping arm away from the frame.

Alternatively, each of the plurality of gripping arms may extend away from the wall member. The plurality of gripping arms may be substantially equally spaced about the wall member. Alternatively still, one or more of the plurality of gripping arms may extend from the frame and one or more of the plurality of gripping arms may extend from the wall member. In any case, each of the plurality of gripping arms may define a notch therein adjacent to the wall member and configured to facilitate breaking of the gripping arm away from the wall member.

The frame may define a flange that extends away from the inner periphery of the frame to an outer flange periphery. At least a portion of the flange may be configured to engage an outer surface of the wall of the vehicle when the plurality of gripping arms engage the inner surface of the wall of the vehicle. The flange may define a beveled inner surface between the wall member and the outer flange periphery. The beveled inner surface of the flange may be sized and configured to hold a bonding medium therein.

The wall of the vehicle may be a sidewall of a trailer.

The wall member may be configured to extend into an opening formed through the wall of the vehicle. Each of the plurality of gripping arms may be configured to engage the inner surface of the wall of the vehicle when the wall member extends into the opening formed through the wall of the vehicle. At least a portion of the flange may be configured to engage an outer surface of the wall of the vehicle when the wall member extends into the opening formed through the wall of the vehicle and the plurality of gripping arms engage the inner surface of the wall of the vehicle. The skylight may further comprise a bonding medium disposed between the flange and the outer surface of the wall of the vehicle. The bonding medium may extend about the opening formed in the wall of the vehicle. The bonding medium may be configured to bond the flange to the outer surface of the wall of the vehicle. The bonding medium may comprise an adhesive tape. Alternatively, the bonding medium may comprise a formable medium. In this case, the plurality of gripping arms may be configured to maintain at least a portion of the flange engaged with the outer surface of the wall of the vehicle while the formable medium cures by engaging the inner surface of the wall of the vehicle when the wall member extends into the opening formed through the wall of the vehicle. The formable medium may be configured to bond the flange to the outer surface of the wall of the vehicle when cured. The formable medium may comprise one of a curable adhesive and a curable sealant.

A method is provided for mounting a skylight to a wall of a vehicle to allow passage of light through the wall. The method may comprise providing the skylight. The skylight may have a frame defining an inner periphery about a window configured to allow passage of light therethrough and may have a flange extending away from the inner periphery of the frame. The inner periphery of the frame may have a plurality of gripping arms extending therefrom. The method may further comprise forming an opening through the wall of the vehicle sized larger than the inner periphery of the frame, applying a bonding medium to one of an inner surface of the flange about the inner periphery of the frame and an outer surface of the wall about the opening, and inserting the plurality of gripping arms into the opening formed through the wall of the vehicle such that the bonding medium contacts the flange and the outer surface of the wall about the opening and the plurality of gripping arms engage an inner surface of the wall adjacent to the opening.

Applying a bonding medium may comprise applying an adhesive tape to the inner surface of the flange between the inner periphery of the frame and an outer periphery of the flange. The method may further comprise breaking the plurality of gripping arms away from the inner periphery of the frame after the adhesive tape bonds the flange to the outer surface of the wall of the vehicle about the opening formed through the wall.

Alternatively, applying a bonding medium may comprise applying a formable bonding medium to the inner surface of the flange between the inner periphery of the frame and an outer periphery of the flange. Applying a formable bonding medium may comprise applying a curable adhesive to the inner surface of the flange between the inner periphery of the frame and the outer periphery of the flange. Alternatively, applying a formable bonding medium may comprise applying a curable sealant to the inner surface of the flange between the inner periphery of the frame and the outer periphery of the flange. In either case, the method may further comprise breaking the plurality of gripping arms away from the inner periphery of the frame after the formable bonding medium cures.

BRIEF DESCRIPTION OF THE DRAWINGS

FIG. 2 is a perspective view of the frame of the skylight of FIG. 1.

FIG. 3 is a magnified view of one portion of the frame of the skylight of FIG. 2.

FIG. 4 is a magnified view of another portion of the frame of the skylight of FIG. 2.

FIG. 7 is a flowchart illustrating one embodiment of a process for installing either of the skylight embodiments illustrated in FIGS. 1-6 in a wall of a vehicle.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
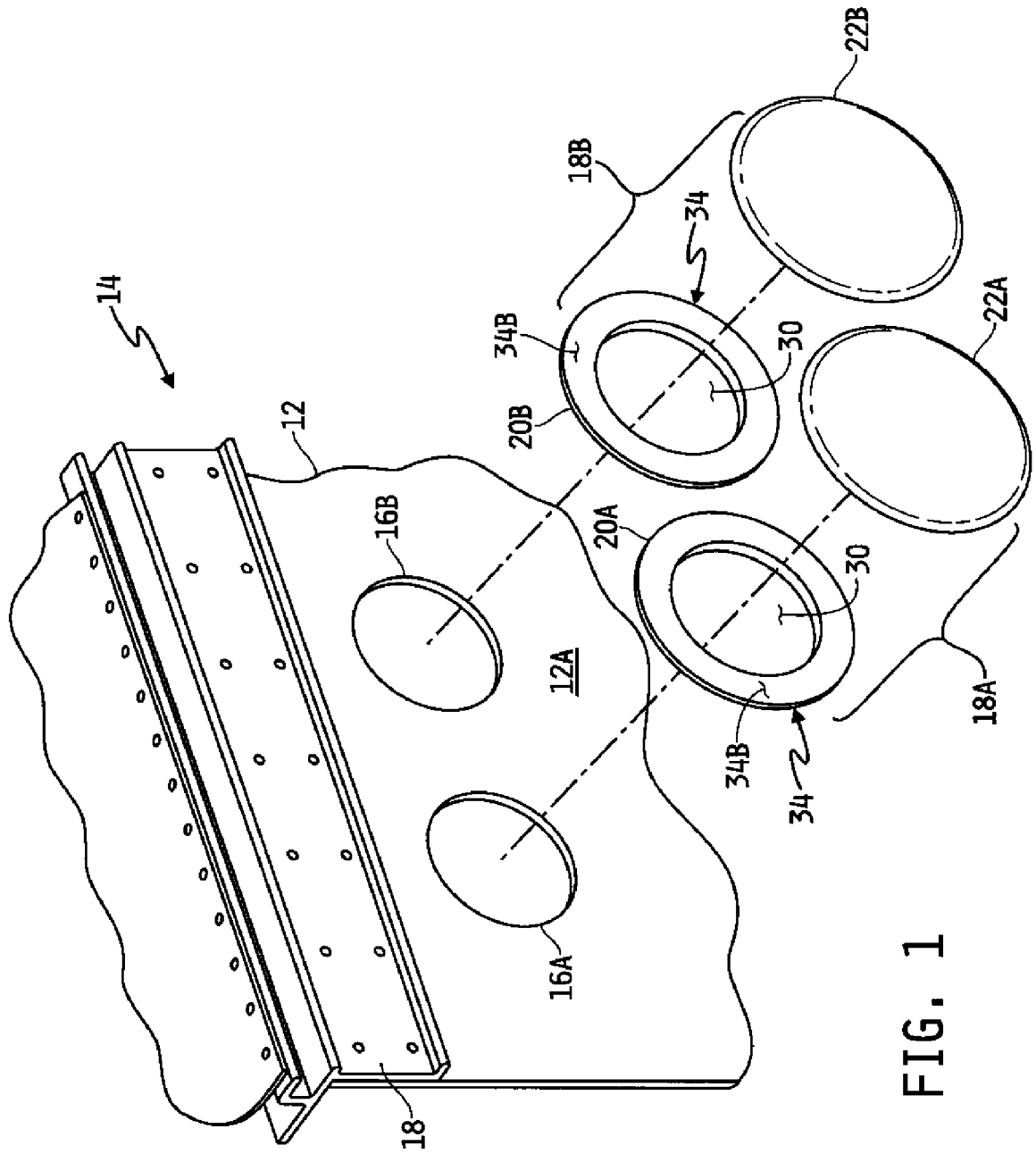
FIG. 1 is a perspective assembly view of installation of one illustrative embodiment of a pair of skylights in a sidewall of a trailer.

Referring now to FIG. 1, a perspective assembly view is shown of installation of one illustrative embodiment of a pair of skylights 18A and 18B and a sidewall 12 of a trailer 14. In the illustrated embodiment, a pair of openings 16A and 16B have been formed in the sidewall 12 of the trailer 14. The openings 16A and 16B are spaced apart relative to each other, and both are positioned approximately the same distance below a top rail 18 of the trailer 14.

The skylights 18A and 18B each include a frame 20A and 20B respectively, and a window 22A and 22B, respectively. The windows 22A and 22B are generally light transmissive, and may be, for example, transparent or translucent. In the illustrated embodiment, each of the frames 20A and 20B define an opening 30 therethrough that is sized slightly smaller than the windows 22A and 22B, and the windows 22A and 22B are configured to be mounted to the frames 20A and 20B, respectively, such that light may pass through the openings 30 defined through the frames 20A and 20B. Each of the frames 20A and 20B further define a flange 34 that extends laterally from, and radially about, the opening 30, and each flange 34 defines an outer flange surface 34B.

In one illustrative embodiment, the openings 16A and 16B are positioned approximately four inches on center from the top rail 18 of the trailer 14, and are spaced apart from each other by approximately 5.5 inches on center. In this embodiment, each of the frames 20A and 20B are sized to have a four inch inner diameter and a five inch outer diameter. The windows 22A and 22B in this embodiment are illustratively 0.062 inch thick, clear, LEXAN® polycarbonate resin thermoplastic, and may be mounted to the frames 20A and 20B, respectively, via any conventional mounting technique, e.g., adhesive or other bonding medium. It will be understood that the foregoing dimensional information is provided only by way of example, and that other dimensions of the skylights 18A and 18B and/or positioning of the skylights 18A and 18B relative to the sidewall 12 of the trailer 14 and/or to each other may alternatively be used. It will further be understood that while two skylights 18A and 18B are illustrated in FIG. 1 as being mounted to the vehicle wall 12, this disclosure contemplates embodiments in which more or fewer skylights are mounted to the vehicle wall 12 at any location, and embodiments in which two or more skylights are mounted to the vehicle wall 12 with any orientation relative to each other and/or with any orientation relative to the vehicle 12 and/or any component thereof. Moreover, it will be understood that light transmissive or translucent material other than LEXAN® may be used to form the windows 22A and 22B. Finally, although the openings 16A and 16B, frames 20A and 20B, and windows 22A and 22B are illustrated in FIG. 1 as being circular and/or annular in shape, this disclosure contemplates other embodiments in which the periphery of the openings 16A, 16B, frames, 20A, 20B and/or windows 22A, 22B have shapes other than circular or annular.

Referring now to FIG. 2, a perspective view is shown of one of the frames, designated generally at 20, of the skylight 18A, 18B illustrated in FIG. 1. In the illustrated embodiment, the frame 20 defines an inner frame periphery 32 that extends radially about the opening 30, and therefore extends radially about the window 22A, 22B (not shown in FIG. 2). The flange member 34 extends laterally away from, and radially about, the opening 30 defined through the frame 20, and the flange member 34 defines an inner flange surface 34A opposite to the outer flange surface 34B (see FIG. 1). The inner flange surface 34A and the outer flange surface 34B merge together and terminate at an outer flange periphery 36.

The frame 20 further defines a wall member 38 that extends downwardly away from the frame 20 adjacent to, and about, the inner periphery 32, of the frame 20. In the embodiment illustrated in FIG. 2, the wall member 38 is made up of a number, e.g., four, of wall segments 39, and a gripping arm 50 extends away from the frame 20, adjacent to the inner periphery 32, between each adjacent wall segment 39.

Referring now to FIG. 3, a magnified portion "A" of the frame 20 of FIG. 2 is shown. In this magnified view, two adjacent wall sections 39 of the wall member 38 are shown terminating at ends 38A and 38B, respectively, to form a gap 40 therebetween. In this embodiment, the illustrated one of the gripping arms 50 is positioned within the gap 40 and extends outwardly away from the frame 20 adjacent to the inner periphery 32. Each of the gripping arms 50 terminates at a wall-engaging member 52 that generally extends beyond an outer edge 38C of the wall member 38. As illustrated in FIG. 3, for example, the wall-engaging member 52 defines a gripping tooth having a wall-engaging surface 54 that is oriented away from the inner periphery 32 generally in the same direction as the flange member 34. As will be described in greater detail hereinafter, the wall-engaging surface 54 of the wall-engaging member 52 is configured to engage an inner surface of the vehicle sidewall 12 adjacent to the opening 16A, 16B when the skylight 18A, 18B is inserted into the opening 16A, 16B formed in the wall 12 of the vehicle 14, or to engage the wall 12 of the vehicle 14 within the opening 16A, 16b when the skylight 18A, 18B is inserted into the opening 16A, 16B, depending upon the thickness of the wall 12 of the vehicle 14 relative to the lengths of the gripping arms 50. As shown in FIG. 4, which is a magnified view of the portion "B" identified in FIG. 2, each of the gripping arms 50 further defines a notch 56 therein adjacent to the frame 20. The notch 56 is configured to facilitate breaking of the gripping arm 50 away from the frame 20 after installation of the skylight 18A, 18B in the wall 12 of the vehicle 14.

Referring again to FIG. 2, the gripping arms 50, and thus the gaps 40, are illustrated as being substantially equally spaced about and adjacent to the inner periphery 32 of the frame 20. Alternatively, the plurality of gripping arms 50 and gaps 40 need not be equally spaced about the inner periphery 32 of the frame 20. Moreover, while four such gripping arms 50 and, corresponding gaps 40, are shown in the illustrated embodiment, it will be understood that more or fewer such gaps 40 and gripping arms 50 may be provided. In an alternative embodiment, the wall member 38 may be a continuous wall member, i.e., with no gaps 40, that extends away from the frame 20 adjacent to, and entirely about, the inner periphery 32 of the frame 20. In such embodiments, the gripping arms 50 may extend from the outer edge 38C of the wall member 38. In either case, the gripping members 52 extend beyond the outer edge 38C of the wall member 38.

Figure 5:
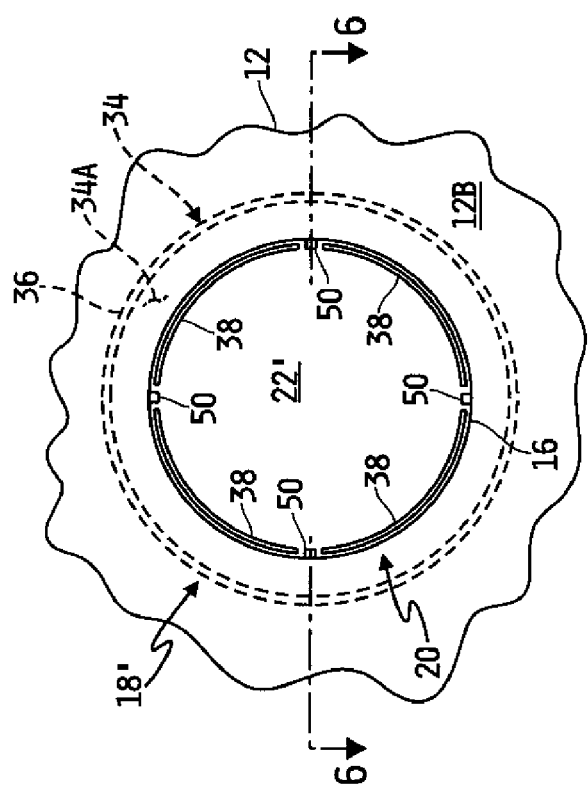
FIG. 5 is an elevational view of the inside surface of another illustrative embodiment of a skylight for a vehicle.

Referring now to FIG. 5, an elevational view of another illustrative embodiment of a skylight 18' is shown mounted to a wall 12, e.g., a sidewall, of a vehicle, e.g., a trailer. The skylight 18' is identical to the skylight 18 illustrated and described herein, with the exception that the window 22' is, in the skylight 18', integral with the frame 20 such that the frame 20 and the window 22' are of unitary construction. In this embodiment, the entire skylight 18' may illustratively be formed of LEXAN® polycarbonate resin thermoplastic in accordance with a conventional molding process, although this disclosure contemplates embodiments in which the skylight 18' is formed of one or more other conventional materials. As illustrated in FIG. 5, the wall member 38 and gripping arms 50 of the skylight 18' extend into the opening 16 that is formed in the wall 12 of the vehicle 14 when the skylight 18' is mounted to the wall 12. As also illustrated in FIG. 5, at least a portion of the inside surface 34A of the flange member 34 contacts an outer surface 12A of the wall 12 when the skylight 18' is mounted to the wall 12.

Figure 6:
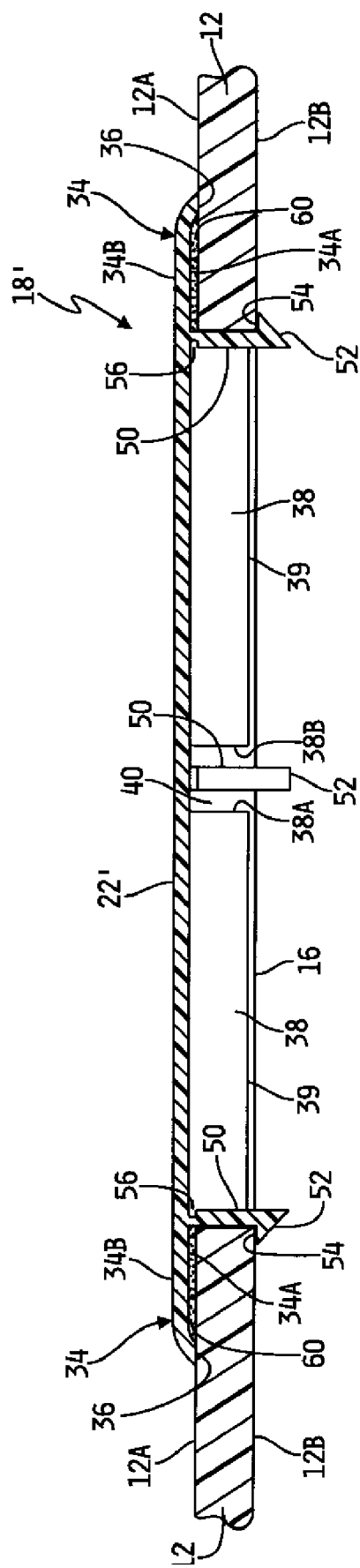
FIG. 6 is a cross-sectional view of the skylight of FIG. 5 as viewed along section lines 6-6 of FIG. 5.

Referring now to FIG. 6, a cross-sectional view of the skylight 18' and vehicle wall 12 of FIG. 5 is shown as viewed through the section line 6-6. As shown in FIG. 6, the gripping arms 50 are configured such that the wall-engaging or gripping surfaces 54 of the wall-engaging or gripping members 52 engage the inner surface 12B of the vehicle side wall 12 when the skylight 18' is mounted to the vehicle wall 12. Alternatively, in embodiments in which the thickness of the vehicle wall 12 between the outer surface 12A and the inner surface 12B thereof is greater than the lengths of the gripping arms 50 relative to the frame 20, the gripping arms 50 are configured to yield inwardly toward each other, i.e., radially away from the frame member 38, such that the gripping surfaces 54 engage the vehicle wall 12 within the opening 16. In either case, a bonding medium 60 is disposed between the inner surface 34A of the flange member 34 and the outer surface 12A of the vehicle wall 12, and the gripping arms 50 act to maintain the flange member 34 in contact with the outer surface 12A of the vehicle wall 12 while the bonding medium 60 sets or cures or otherwise bonds the flange 34 to the outer surface 12A of the vehicle wall 12. Thereafter, the gripping arms 50 may be manually broken away from the skylight 18' by repeatedly moving the gripping arms 50 relative to the frame 20 until the gripping arms 50 break away at the notches 56.

Referring now to FIG. 7, a flowchart is shown of one illustrative embodiment of a process 70 for installing either the skylight embodiments 18 or 18' in a wall 12 of a vehicle 14. While the vehicle wall 12 has been illustrated in FIG. 1 as comprising a side wall of a conventional trailer, it will be understood that the wall 12 may alternatively be a side wall, floor, ceiling or other wall of other conventional towed or towing vehicles. In any case, the process 70 begins at step 72 where a skylight 18 or 18' is provided, and has at least a frame 20 defining an inner periphery 32 about a window 22, 22', and having a flange 34 extending away from the inner periphery 32 of the frame 20, and a plurality of gripping arms 50 extending away from the inner periphery 32 of the frame 20. Thereafter at step 74, an opening 16 is formed through a wall 12 of a vehicle, and the opening 16 is sized to be at least slightly larger than the inner periphery 32 of the frame 20. By forming the opening 16 in this manner, the wall member 38 and gripping arms 50 can extend into the opening 16 when the skylight 18, 18' is mounted to the wall 12 of the vehicle.

Following step 74, a bonding medium is applied at step 76 to the inner surface 34A of the flange member 34. Illustratively, the bonding medium 60 is applied to the inner surface 34A of the flange member 30 entirely about the inner periphery 32 of the frame 20 so that no gaps will exist in the bonding medium 60 about the periphery 32 of the frame 20. Alternatively, the bonding medium 60 may be applied to the outer surface 12A of the wall 12, e.g., about the periphery of the opening 16, or to both of the inner surface 34A of the flange member 34 and the outer surface 12A of the wall 12. In one embodiment, the bonding medium 60 may be an adhesive tape, e.g., a high-bond, double-sided formable gasket tape. Alternatively, the bonding medium 60 may be provided in the form of a medium that if configured to set or cure after the skylight 18, 18' is mounted to the side 12 of the vehicle as just described, thereby forming an air-tight and water-tight bond between at least a portion of the inner surface 34A of the flange member 34 and the outer surface 12A of the wall 12 of the vehicle about the inner periphery 32 of the skylight 18, 18'. Illustratively, the formable medium may be or include a durable adhesive or a durable sealant or the like. In one illustrative embodiment, for example, the bonding medium 60 may be LORD® 7556 equal-mix, two-component, clear urethane adhesive, although this disclosure contemplates alternatively using other conventional adhesives, sealants or the like.

From step 76, the process 70 advances to step 78 where the gripping arms 50 of the skylight 18, 18' are inserted into the opening 16 through the wall 12 of the vehicle such that the bonding medium 60 contacts the flange member 34 and the outer surface 12A of the vehicle wall 12 about the opening 16 while the gripping arms 50 engage the vehicle wall 12, e.g., the inner surface 12B of the vehicle wall 12 adjacent to the opening 16 as illustrated in FIGS. 5 and 6, or the vehicle wall 12 within the opening 16 when the thickness of the vehicle wall 12 between the outer surface 12A and inner surface 12B thereof is greater than the lengths of the gripping arms 50 relative to the frame 20. With the gripping arms 50 engaging the vehicle wall 12 as just described, the skylight 18, 18' is thereby held in place while the bonding medium 60 cures or sets. Following step 78, an optional step 80 may be formed in which the gripping arms 50 are broken away from the inner periphery 32 of the frame 20 of the skylight 18, 18' after the bonding medium 60 cures or sets.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A skylight for mounting to a wall of a vehicle to allow passage of light through the wall, the skylight comprising:
    a frame having a window configured to allow passage of light through at least a portion of the frame, the frame defining an inner periphery about the window,
    a wall member extending away from the frame adjacent to and about the inner periphery of the frame, and
    a plurality of spaced apart gripping arms extending away from one of the wall member and the frame adjacent to the inner periphery of the frame with the plurality of gripping arms extending beyond the wall member, each of the plurality of gripping arms configured to engage the wall of the vehicle.

2. The skylight of claim 1 wherein the window is separate from, and is configured to be mounted to, the frame.

3. The skylight of claim 1 wherein the window and the frame are of unitary construction.

4. The skylight of claim 1 wherein the wall member comprises a number of separate wall sections each extending from the frame adjacent to and about the inner periphery of the frame,
    and wherein adjacent ones of each the number of wall sections define a gap therebetween.

5. The skylight of claim 4 wherein each of the plurality of gripping arms extends from the frame within a different one of the gaps defined between adjacent ones of the number of separate wall sections.

6. The skylight of claim 5 wherein the gaps are substantially equally spaced about and adjacent to the inner periphery of the frame.

7. The skylight of claim 5 wherein each of the plurality of gripping arms defines a notch therein adjacent to the frame and configured to facilitate breaking of the gripping arm away from the frame.

8. The skylight of claim 1 wherein each of the plurality of gripping arms extends away from the wall member.

9. The skylight of claim 8 wherein the plurality of gripping arms are substantially equally spaced about the wall member.

10. The skylight of claim 8 wherein each of the plurality of gripping arms defines a notch therein adjacent to the wall member and configured to facilitate breaking of the gripping arm away from the wall member.

11. The skylight of claim 1 wherein the frame defines a flange that extends away from the inner periphery of the frame to an outer flange periphery, at least a portion of the flange configured to engage an outer surface of the wall of the vehicle when the plurality of gripping arms engage the inner surface of the wall of the vehicle.

12. The skylight of claim 11 wherein the flange defines a beveled inner surface between the wall member and the outer flange periphery.

13. The skylight of claim 12 wherein the beveled inner surface of the flange is sized and configured to hold a bonding medium therein.

14. The skylight of claim 1 wherein the wall of the vehicle is a sidewall of a trailer.

15. The skylight of claim 1 wherein the wall member is configured to extend into an opening formed through the wall of the vehicle,
    wherein each of the plurality of gripping arms is configured to engage the wall of the vehicle when the wall member extends into the opening formed through the wall of the vehicle,
    and wherein at least a portion of the flange is configured to engage an outer surface of the wall of the vehicle when the wall member extends into the opening formed through the wall of the vehicle and the plurality of gripping arms engage the wall of the vehicle.

16. The skylight of claim 15 further comprising a bonding medium disposed between the flange and the outer surface of the wall of the vehicle, the bonding medium extending about the opening formed in the wall of the vehicle, the bonding medium configured to bond the flange to the outer surface of the wall of the vehicle.

17. The skylight of claim 16 wherein the bonding medium comprises an adhesive tape.

18. The skylight of claim 16 wherein the bonding medium comprises a formable medium,
    wherein the plurality of gripping arms are configured to maintain the at least a portion of the flange engaged with the outer surface of the wall of the vehicle while the formable medium cures by engaging the wall of the vehicle when the wall member extends into the opening formed through the wall of the vehicle.

19. The skylight of claim 18 wherein the formable medium is configured to bond the flange to the outer surface of the wall of the vehicle when cured.

20. The skylight of claim 19 wherein the formable medium comprises one of a curable adhesive and a curable sealant.

21. A method of mounting a skylight to a wall of a vehicle to allow passage of light through the wall, the method comprising:
    providing the skylight having a frame defining an inner periphery about a window configured to allow passage of light therethrough and having a flange extending away from the inner periphery of the frame, the inner periphery of the frame having a plurality of gripping arms extending therefrom,
    forming an opening through the wall of the vehicle sized larger than the inner periphery of the frame,
    applying a bonding medium to one of an inner surface of the flange about the inner periphery of the frame and an outer surface of the wall about the opening, and
    inserting the plurality of gripping arms into the opening formed through the wall of the vehicle such that the bonding medium contacts the flange and the outer surface of the wall about the opening and the plurality of gripping arms engage wall.

22. The method of claim 21 wherein applying a bonding medium comprises applying an adhesive tape to the inner surface of the flange between the inner periphery of the frame and an outer periphery of the flange.

23. The method of claim 22 further comprising breaking the plurality of gripping arms away from the inner periphery of the frame after the adhesive tape bonds the flange to the outer surface of the wall of the vehicle about the opening formed through the wall.

24. The method of claim 21 wherein applying a bonding medium comprises applying a formable bonding medium to the inner surface of the flange between the inner periphery of the frame and an outer periphery of the flange.

25. The method of claim 24 wherein applying a formable bonding medium comprises applying a curable adhesive to the inner surface of the flange between the inner periphery of the frame and the outer periphery of the flange.

26. The method of claim 23 wherein applying a formable bonding medium comprises applying a curable sealant to the inner surface of the flange between the inner periphery of the frame and the outer periphery of the flange.

27. The method of claim 24 further comprising breaking the plurality of gripping arms away from the inner periphery of the frame after the formable bonding medium cures.

28. The skylight of either of claims 5 or 8 wherein the gaps are not equally spaced about and adjacent to the inner periphery of the frame.

29. The skylight of claim 1 wherein the gripping arms are configured to engage an inner surface of the wall of the vehicle.

30. The skylight of claim 15 wherein each of the gripping arms is configured to engage an inner surface of the wall of the vehicle adjacent to the opening formed through the wall when the wall member extends into the opening.

31. The skylight of claim 15 wherein each of the gripping arms is configured to engage the wall of the vehicle within the opening formed through the wall when the wall member extends into the opening.

32. The method of claim 21 wherein inserting comprises inserting the plurality of gripping arms into the opening formed through the wall of the vehicle such that the bonding medium contacts the flange and the outer surface of the wall about the opening and the plurality of gripping arms engage an inner surface of the wall of the vehicle adjacent to the opening formed through the wall of the vehicle.

33. The method of claim 21 wherein inserting comprises inserting the plurality of gripping arms into the opening formed through the wall of the vehicle such that the bonding medium contacts the flange and the outer surface of the wall about the opening and the plurality of gripping arms engage the wall of the vehicle within the opening formed through the wall of the vehicle.

* * * * *